(12) United States Patent
Marina

(10) Patent No.: US 7,162,828 B1
(45) Date of Patent: Jan. 16, 2007

(54) AUTOMATIC FISHING DEVICE

(76) Inventor: Michel Marina, 427 S. Navarra Dr., Scotts Valley, CA (US) 95066

( * ) Notice: Subject to any disclaimer, the term of this patent is extended or adjusted under 35 U.S.C. 154(b) by 63 days.

(21) Appl. No.: 11/033,357

(22) Filed: Jan. 10, 2005

(51) Int. Cl.
*A01K 91/10* (2006.01)

(52) U.S. Cl. .......................................................... 43/15

(58) Field of Classification Search ................... 43/15, 43/16; *A01K 91/10*
See application file for complete search history.

(56) References Cited

U.S. PATENT DOCUMENTS

| | | | | | |
|---|---|---|---|---|---|
| 10,795 | A | * | 4/1854 | Saxe ...................... | 43/18.1 R |
| 2,577,552 | A | * | 12/1951 | White, Jr. ................ | 242/375.1 |
| 2,577,553 | A | * | 12/1951 | White, Jr. .................. | 242/377 |
| 2,577,554 | A | * | 12/1951 | White, Jr. .................. | 242/377 |
| 2,577,555 | A | * | 12/1951 | White, Jr. .................. | 242/377 |
| 2,640,290 | A | * | 6/1953 | Ames et al. .................... | 43/15 |
| 2,770,906 | A | * | 11/1956 | Hood ............................ | 43/16 |
| 2,781,601 | A | * | 2/1957 | Crossley ....................... | 43/15 |
| 2,851,812 | A | | 9/1958 | Beck | |
| 2,934,847 | A | | 5/1960 | Duff | |
| 3,016,648 | A | | 1/1962 | Ingersoll et al. | |
| 3,078,609 | A | | 2/1963 | Efird | |
| 3,293,789 | A | * | 12/1966 | Pack ............................. | 43/15 |
| 3,307,286 | A | * | 3/1967 | Unger ........................... | 43/15 |
| 3,309,808 | A | * | 3/1967 | George, Sr. ................... | 43/15 |
| 3,558,123 | A | * | 1/1971 | Yew ............................. | 267/34 |
| 3,672,085 | A | * | 6/1972 | King ............................ | 43/15 |
| 3,686,785 | A | | 8/1972 | Dixon | |
| 3,874,105 | A | * | 4/1975 | Andree et al. ................. | 43/15 |
| 3,914,894 | A | * | 10/1975 | Kobza ........................... | 43/15 |
| 4,085,536 | A | * | 4/1978 | Wood, Jr. ...................... | 43/15 |
| 4,159,589 | A | * | 7/1979 | Pendegraft ..................... | 43/15 |
| 4,188,742 | A | * | 2/1980 | Oulman ......................... | 43/15 |
| 4,204,355 | A | * | 5/1980 | Almond ......................... | 43/15 |
| 4,217,719 | A | * | 8/1980 | McDonnell .................... | 43/15 |
| 4,235,035 | A | * | 11/1980 | Guthrie ......................... | 43/15 |
| 4,270,298 | A | * | 6/1981 | Hodshire ....................... | 43/15 |
| 4,309,838 | A | * | 1/1982 | Hodshire ....................... | 43/15 |
| 4,312,147 | A | * | 1/1982 | Christiansen .................. | 43/15 |
| 4,321,767 | A | * | 3/1982 | Hodshire ....................... | 43/15 |
| 4,382,346 | A | * | 5/1983 | Gardner ......................... | 43/15 |
| 4,393,615 | A | * | 7/1983 | Hodshire ....................... | 43/15 |
| 4,400,902 | A | * | 8/1983 | Adoline ......................... | 43/15 |
| 4,416,079 | A | * | 11/1983 | Hodshire ....................... | 43/15 |
| 4,461,113 | A | * | 7/1984 | Erwin ............................ | 43/15 |
| 4,471,553 | A | * | 9/1984 | Copeland ....................... | 43/15 |

(Continued)

*Primary Examiner*—Teri Pham Luu
*Assistant Examiner*—Kimberly S. Smith
(74) *Attorney, Agent, or Firm*—Charles L. Thoeming; Jack Lo

(57) ABSTRACT

An automatic fishing device is comprised of a fishing rod support for supporting a fishing rod. A spring loaded fishing line puller is movably attached to the support and arranged to engage a portion of the line along the fishing rod. An actuating arm hinged to a fixed position on the support is attached to a forward end of the fishing rod. A latch connected to the actuating arm is arranged to secure the puller in a cocked position under spring loading. When the fishing line is pulled by a fish, the forward end of the fishing rod is tilted down to tilt the actuating arm downward. The latch is moved by the actuating arm to disengage from the line puller, which is quickly moved by a spring away from the fishing rod to momentarily retract the fishing line and set the fish hook in the fish.

12 Claims, 3 Drawing Sheets

U.S. PATENT DOCUMENTS

| | | | | |
|---|---|---|---|---|
| 4,476,645 A | * | 10/1984 | Paarmann | 43/15 |
| 4,495,721 A | * | 1/1985 | Emory, Jr. | 43/21.2 |
| 4,651,459 A | * | 3/1987 | Wurtz | 43/15 |
| 4,730,408 A | * | 3/1988 | Miller | 43/15 |
| 4,908,973 A | * | 3/1990 | Perks | 43/17 |
| 4,924,617 A | * | 5/1990 | Parent | 43/15 |
| 4,993,181 A | * | 2/1991 | Cooper | 43/15 |
| 4,996,789 A | * | 3/1991 | Hoover | 43/24 |
| 5,050,332 A | * | 9/1991 | Cross | 43/15 |
| 5,163,243 A | * | 11/1992 | Wold et al. | 43/17 |
| 5,524,376 A | * | 6/1996 | Flisak | 43/15 |
| 5,570,534 A | * | 11/1996 | Ford | 43/19.2 |
| 5,813,161 A | * | 9/1998 | Yai | 43/15 |
| 6,012,247 A | * | 1/2000 | Kinsey | 43/16 |
| 6,050,019 A | * | 4/2000 | Anderson | 43/15 |
| 6,094,851 A | * | 8/2000 | Guidry | 43/15 |
| 6,125,570 A | * | 10/2000 | Valrey, Sr. | 43/15 |
| 6,336,287 B1 | * | 1/2002 | Lobato | 43/16 |
| 6,430,864 B1 | * | 8/2002 | Thomure et al. | 43/15 |
| 6,564,496 B1 | * | 5/2003 | Scherg | 43/17 |
| 6,594,940 B1 | * | 7/2003 | Dobmeier | 43/15 |
| 6,722,078 B1 | * | 4/2004 | Kelley et al. | 43/19.2 |
| 6,772,551 B1 | * | 8/2004 | Bielinski et al. | 43/15 |
| 6,944,987 B1 | * | 9/2005 | Van Loef | 43/15 |
| 7,017,296 B1 | * | 3/2006 | Templeman et al. | 43/15 |

* cited by examiner

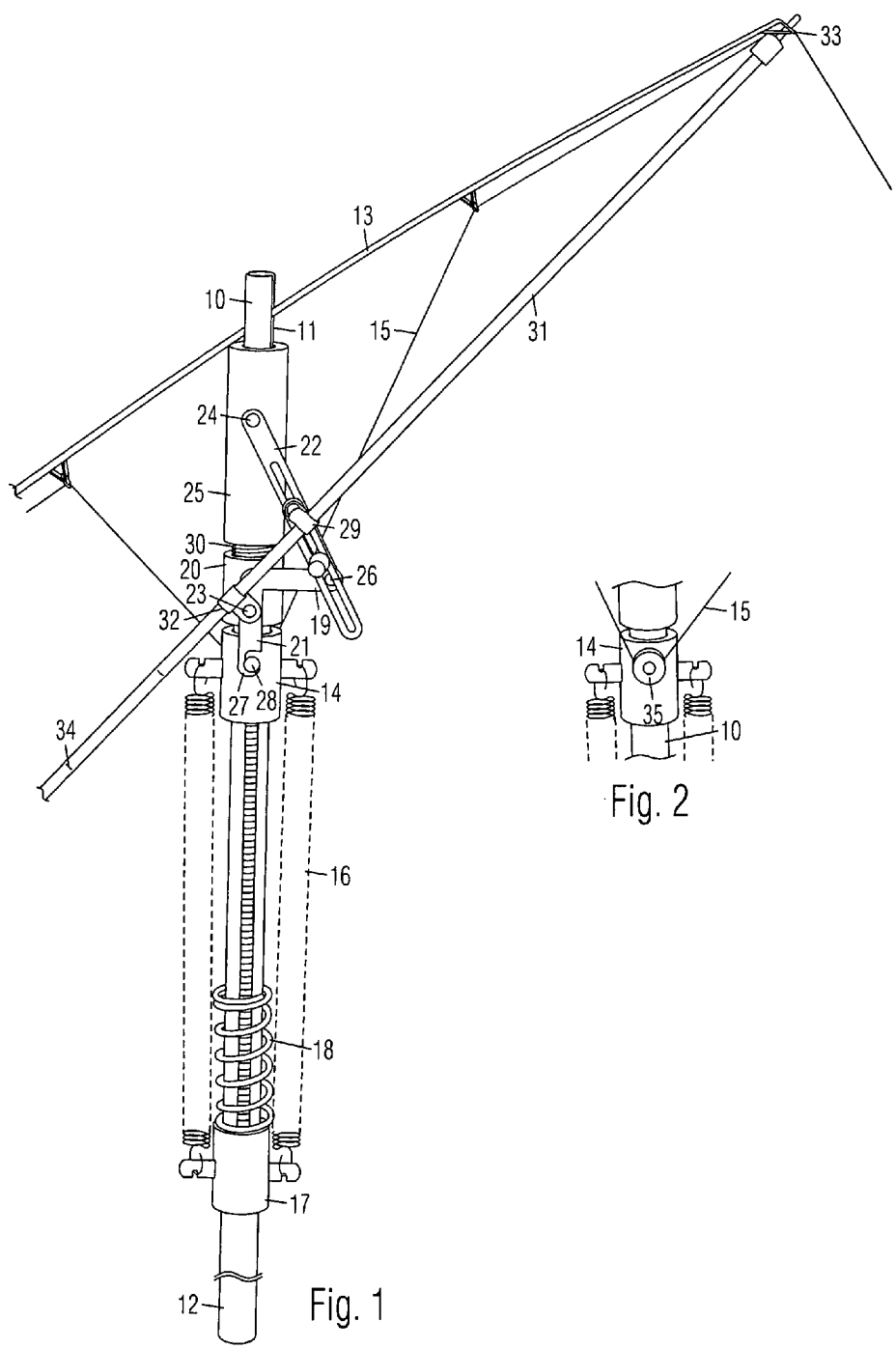

AUTOMATIC FISHING DEVICE

BACKGROUND OF THE INVENTION

1. Field of the Invention

The invention generally relates to devices for automatically setting a fishing hook in a fish.

2. Prior Art

A fishing rod is typically comprised of a flexible rod with a spool of fishing line near a proximal end. The fishing line is guided to the distal end of the rod by loops on the rod. A hook is attached to the free end of the fishing line, and a lure is attached to the hook. When a fish bites the lure and pulls on the line, the fisherman jerks the fishing rod upward to set the hook into the mouth of the fish. However, waiting for a bite requires constant attention through long periods of inactivity.

There are devices that automatically set the hook into the fish when the line is pulled to relieve the fisherman from manual monitoring. U.S. Pat. No. 2,934,847 to Duff and U.S. Pat. No. 3,078,609 to Efird each disclose a fishing rod with a built-in automatic hook setting device. When the line is pulled, a trigger engaging the line is released to activate a lever which jerks on the line to set the hook. The primary disadvantage is that these are specially-made fishing rods. These automatic hook setting devices cannot be retrofitted to an ordinary fishing rod by a user.

U.S. Pat. No. 3,016,648 to Ingersoll et al. and U.S. Pat. No. 3,686,785 to Dixon each disclose a pivoted fishing rod support. The support is cocked against spring pressure and held in position by a latch. When the line is pulled and the fishing rod is tilted downward slightly, the support is pulled down by the fishing rod slightly to release itself from the latch. The support and the fishing rod are jerked upward by a spring to set the hook. The primary disadvantage is the strong spring tension needed to move the entire fishing rod makes the device difficult to set. Also, the jerking fishing rod may cause injury.

BRIEF SUMMARY OF THE INVENTION

An automatic fishing device is comprised of a fishing rod support for supporting a fishing rod. A spring loaded fishing line puller is movably attached to the support and arranged to engage a portion of the line along the fishing rod. An actuating arm hinged to a fixed position on the support is attached to a forward end of the fishing rod. A latch connected to the actuating arm is arranged to secure the puller in a cocked position under spring loading. When the fishing line is pulled by a fish, the forward end of the fishing rod is tilted down to tilt the actuating arm downward. The latch is moved by the actuating arm to disengage from the line puller, which is quickly moved by a spring away from the fishing rod to momentarily retract the fishing line and set the fish hook in the fish.

BRIEF DESCRIPTION OF THE SEVERAL VIEWS OF THE DRAWING

FIG. 1 is a front view of the automatic fishing device in a cocked position.

FIG. 2 is a rear view thereof showing a fishing line engaged by a line puller.

DRAWING REFERENCE NUMERALS

Figure 3:
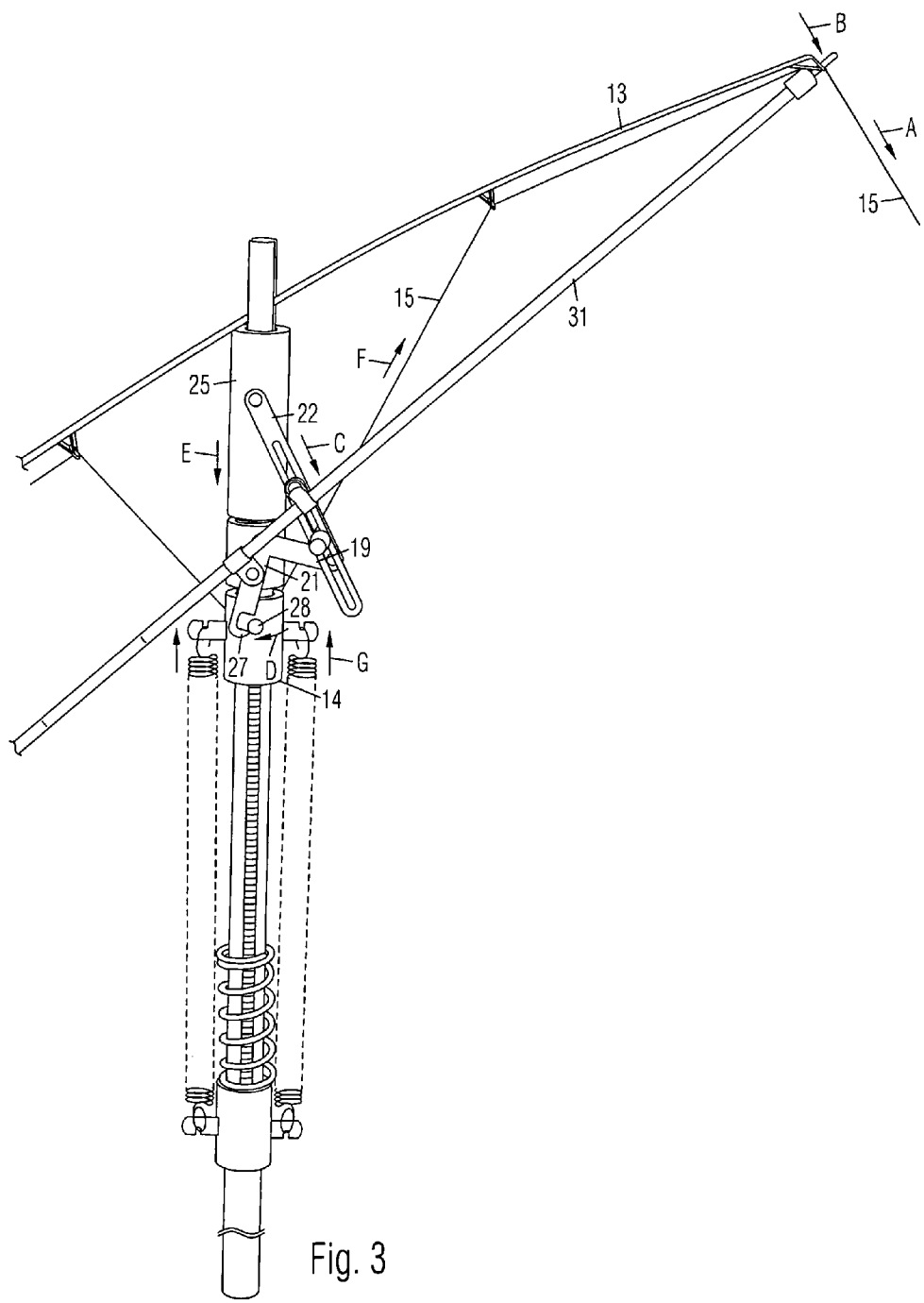
FIG. 3 shows the fishing line being pulled and a latch being released from the line puller.

| | |
|---|---|
| 10. Support | 11. Cradle |
| 12. Lower End | 13. Fishing Rod |
| 14. Puller | 15. Fishing Line |
| 16. Tension Spring | 17. Anchor |
| 18. Damper | 19. Latch |
| 20. Fixed Position | 21. First Member |
| 22. Second Member | 23. First Pivot |
| 24. Second Pivot | 25. Slide |
| 26. Third Pivot | 27. Hook |
| 28. Pin | 29. First Bracket |
| 30. Compression Spring | 31. Actuating Arm |
| 32. Second Bracket | 33. Loop |
| 34. Length Markings | 35. Engaging Member |
| A–J. Movement Directions | |

DETAILED DESCRIPTION OF THE INVENTION

FIGS. 1–2

A preferred embodiment of an automatic fishing device is comprised of an elongated fishing rod support 10 with a cradle 11 at an upper end. In this example, support 10 is comprised of a hollow tube with a lower end 12 for inserting into soft ground, but lower end 12 may be attached to a base or legs instead. A fishing rod 13 is arranged on support 10 by positioning an intermediate portion in cradle 11 and placing the handle (not shown) on the ground.

A movable fishing line puller 14 is arranged to engage a portion of a fishing line 15 along fishing rod 13. Puller 14 is comprised of a collar movable along support 10. Puller 14 is biased away from fishing rod 13 by tension springs 16 connected between puller 14 and an anchor 17 on support 10. Anchor 17 may be adjusted along support 10 for adjusting the tension of springs 16. A damper 18 adjacent anchor 17 is arranged for cushioning the impact of puller 14. Damper 18 may be a spring, a foam cushion, or other resilient material.

A latch 19 hinged to a fixed position 20 on support 10 is arranged to secure puller 14 in a cocked position under spring loading. Latch 19 is comprised of a first member 21 and a second member 22. First member 21 is hinged to fixed position 20 by a first pivot 23. Second member 22 is hinged by a second pivot 24 to a slide 25 movable along an upper portion of support 10. First member 21 and second member 22 are connected together by a third pivot 26 which is offset from a straight line between first pivot 23 and second pivot 24. A hook 27 on first member 21 is arranged to engage a pin 28 on puller 14. Second member 22 is comprised of telescopic portions for length adjustment when fishing rod 13 is positioned at different angles. A first bracket 29 is attached to second member 22. A compression spring 30 is positioned between fixed position 20 and slide 25 to automatically bias slide 25 upward and bias hook 27 against pin 28.

An actuating arm 31 is supported by a second bracket 32 hinged to fixed position 20 on support 10, and by first bracket 29 on second member 22. Arm 31 is comprised of a rod with length markings 34, and may have a round or rectangular cross section. A forward end of arm 31 is arranged to engage a loop 33 of fishing rod 13. Arm 31 may engage other loops along fishing rod 13 for adjusting sensitivity to bites. Arm 31 may be removed from brackets 29, 32 and 33 and used as a ruler for measuring the length of a fish.

FIG. 1 is a front view showing puller 14 held by latch 19 in a cocked position under spring loading. FIG. 2 is a rear view showing fishing line 15 hooked around a engaging member 35 on puller 14. In this example, engaging member 35 is comprised of a roller, but it may be a pin or any other device for engaging fishing line 15.

FIGS. 3–4

Figure 4:
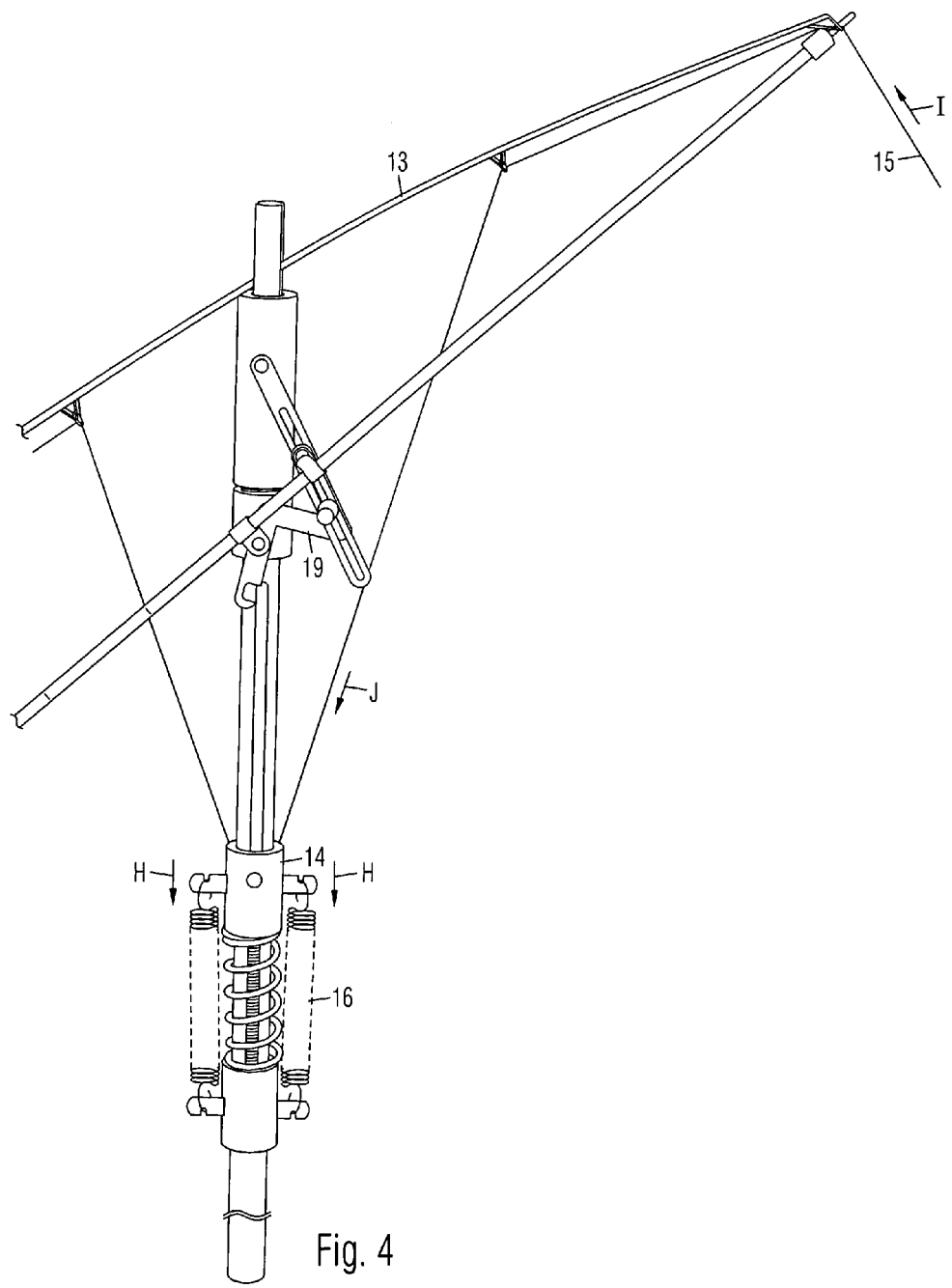
FIG. 4 shows the line puller momentarily retracting the fishing line.

The operation of the automatic fishing device is shown in FIGS. 3–4. In FIG. 3, when fishing line 15 is pulled by a fish at A, the forward end of fishing rod 13 is tilted down to tilt actuating arm 31 downward at B. Second member 22 is moved by actuating arm at C to rotate first member 21 at D and disengage hook 27 from pin 28 on line puller 14. When second member 22 is moved at C, slide 25 is moved down at E. The downward movement of slide 25 is further facilitated by the downward pressure from fishing rod 13. An intermediate portion of line 15 is pulled upward at F when line 15 is pulled by the fish, which lifts puller 14 slightly at G to facilitate release of latch 19.

In FIG. 4, after latch 19 is released, puller 14 is quickly moved by springs 16 at H away from fishing rod 13 to momentarily retract fishing line 15 at I and J and set the fish hook in the fish.

Although the foregoing description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

I claim:

1. An automatic fishing device, comprising:
a fishing rod support with a cradle at an upper end for supporting a fishing rod and a lower end for positioning on the ground, wherein the fishing rod includes a forward end;
a movable fishing line puller arranged for engaging a portion of a fishing line along the fishing rod, wherein the puller comprises a collar movable linearly along an elongated portion of the support and an engaging member on the collar for engaging an upper side of the fishing line, and wherein the puller is biased away from the fishing rod by spring assemblies connected between the puller and an anchor on the support;
a latch hinged to a fixed position on the support and arranged to engage the puller to secure the puller in a cocked position under spring loading, wherein when the fishing line is tugged by a fish, the puller is pulled upwardly by the fishing line and disengaged from the latch, the puller is moved away from the fishing rod by the spring assemblies, and the portion of the fishing line is pulled away from the fishing rod by the puller to set a fish hook on the fishing line in the fish; and
an actuating arm that initiates and facilitates disengagement of the latch from the puller from deflection of the forward end of the fishing rod by the pull on the fishing line.

2. The automatic fishing device of claim 1, wherein the engaging member on the puller comprises a roller.

3. The automatic fishing device of claim 1, further comprising a damper on the support below the puller to cushion the impact of the puller after release from the latch.

4. An automatic fishing device, comprising:
a fishing rod support with a cradle at an upper end for supporting a fishing rod and a lower end for positioning on the ground, wherein the fishing rod includes a forward end;
a movable fishing line puller arranged for engaging a portion of a fishing line along the fishing rod, wherein the puller comprises a collar movable linearly along an elongated portion of the support and an engaging member on the collar for engaging an upper side of the fishing line, and wherein the puller is biased away from the fishing rod by spring assemblies connected between the puller and an anchor on the support;
a latch hinged to a fixed position on the support and arranged to engage the puller to secure the puller in a cocked position under spring loading; and
an actuating arm supported by a first bracket on the latch and a second bracket on the support, wherein a forward end of the arm is arranged for engaging a loop on the fishing rod forward end;
wherein when the fishing line is tugged by a fish, the forward end of the actuating arm is moved downward by the fishing rod, the latch is moved by the actuating arm to release the puller, the puller is moved away from the fishing rod by the spring, and the portion of the fishing line is pulled away from the fishing rod by the puller to set a fish hook on the fishing line in the fish.

5. The automatic fishing device of claim 4, wherein the engaging member on the puller comprises a roller.

6. The automatic fishing device of claim 4, further comprising a damper on the support below the puller to cushion the impact of the puller after release from the latch.

7. The automatic fishing device of claim 4, further comprising length markings on the actuating arm for measuring fish length.

8. An automatic fishing device, comprising:
a fishing rod support with a cradle at an upper end for supporting a fishing rod and a lower end for positioning on the ground, wherein the fishing rod includes a forward end;
a movable fishing line puller arranged for engaging a portion of a fishing line along the fishing rod, wherein the puller comprises a collar movable linearly along an elongated portion of the support, and an engaging member on the collar for engaging an upper side of the fishing line, the puller is biased away from the fishing rod by spring assemblies connected between the puller and an anchor on the support; and
a latch hinged to a fixed position on the support and arranged to engage the puller to secure the puller in a cocked position under spring loading, the latch comprises a first member and a second member, wherein the first member is hinged to the fixed position by a first pivot, the second member is hinged by a second pivot to a slide movable along an upper portion of the support, the first member and the second member are connected together by a third pivot which is offset from a straight line between the first pivot and the second pivot, a hook on the first member is arranged to engage a pin on the puller, the second member comprises telescopic portions for length adjustment when the fishing rod is positioned at different angles; and
an actuating arm supported by a first bracket on the second member of the latch, and by a second bracket on the support, the arm comprises a rod with a forward end arranged for engaging a loop on the fishing rod forward end;
wherein when the fishing line is tugged by a fish, the forward end of the actuating arm is moved downward by the fishing rod, the latch is moved by the actuating arm to release the puller, the puller is moved away from the fishing rod by the spring assemblies, and the portion of the fishing line is pulled away from the fishing rod by the puller to set a fish hook on the fishing line in the fish.

9. The automatic fishing device of claim 8, wherein the engaging member on the puller comprises a roller.

10. The automatic fishing device of claim 8, further comprising a damper on the support below the puller to cushion the impact of the puller after release from the latch.

11. The automatic fishing device of claim 8, further comprising length markings on the actuating arm for measuring fish length.

12. The automatic fishing device of claim 8, further comprising a compression spring between the fixed position and the slide to automatically bias the slide upward and bias the hook against the pin.

\* \* \* \* \*